United States Patent [19]

Frank

[11] 4,433,993
[45] Feb. 28, 1984

[54] GLASS SHEET SHAPING AND TEMPERING USING MULTIPLE COOLING STATIONS

[75] Inventor: Robert G. Frank, Murrysville, Pa.
[73] Assignee: PPG Industries, Inc., Pittsburgh, Pa.
[21] Appl. No.: 375,064
[22] Filed: May 5, 1982
[51] Int. Cl.³ ............................................. C03B 23/02
[52] U.S. Cl. ........................................ 65/104; 65/106; 65/273; 65/351
[58] Field of Search ................. 65/104, 107, 273, 351, 65/106

[56] References Cited

U.S. PATENT DOCUMENTS

| | | | |
|---|---|---|---|
| 3,684,473 | 8/1972 | Ritter | 65/104 |
| 3,846,106 | 11/1974 | Seymour | 65/114 |
| 4,197,108 | 4/1980 | Frank et al. | 65/273 |

FOREIGN PATENT DOCUMENTS 3391  8/1979  European Pat. Off. .

*Primary Examiner*—Arthur D. Kellogg
*Attorney, Agent, or Firm*—Edward I. Mates; William D. West

[57] ABSTRACT

The present invention relates to shaping and tempering glass sheets using a pair of cooling stations and an access area with a common tunnel-like furnace and a common shaping station. The cooling stations are located near the common glass sheet shaping station along angularly diverging paths of movement from said shaping station so that a first cooling station for chilling a glass sheet bent about an axis of curvature approximately parallel to its initial path of movement through the furnace is located along an extension of the path and a second cooling station for chilling a glass sheet bent about an axis substantially normal to the path of glass sheet movement through the furnace is located to one side of said shaping station and said access area is located to the other side of said shaping station. The access area permits ready change of shaping molds at the shaping station.

5 Claims, 2 Drawing Figures

GLASS SHEET SHAPING AND TEMPERING USING MULTIPLE COOLING STATIONS

BACKGROUND OF THE INVENTION

1. Field of the Invention

The present invention relates to the shaping and tempering of glass sheets of different configurations using a horizontal processing technique that avoids the need for tongs, which distort the glass locally during its processing.

Shaped, tempered glass sheets are used in automobiles both in the rear windows and in the side windows thereof. The side windows are relatively short and are conveniently shaped about axes extending essentially longitudinally of the initial path of movement through a furnace. Rear windows are elongated across the width of the installed vehicle and are bent about an axis that extends from the roof of the car toward the rear portion of the body. Prior to the present invention, apparatus for bending side lights was not necessarily used for shaping rear windows, and vice versa. However, with the automobile production rate decreasing, there is a need to provide equipment that operates more universally so that the equipment need not be idled for extended periods when order books are small.

The capital costs for fabricating apparatus for shaping and tempering glass sheets represents a relatively large investment in the construction and installation of a furnace and additional expenditure for the cooling station. When prior art constructions are used in the manner for which they were designed, a separate furnace is needed for apparatus to make rear windows and a separate furnace is needed to make side windows. Wide furnaces suitable to handle rear windows transported sidewise for passage in a straight line through the furnace to a shaping station for shaping about an axis along the initial path of travel and thence through a cooling station would be too wide to handle smaller side windows and would be inefficient if used to process the shorter side windows. Narrower furnaces suitable to process back windows by conveying them lengthwise through the furnace, shaping them to a desired shape and then transferring them laterally after shaping into a cooling station disposed to one side of the shaping station have been developed, and apparatus has been made in the past to shuttle bent glass sheets to opposite sides of an initial path alternately for cooling prior to returning the cooled sheet to a continuation of the initial path.

There have been prior apparatus combining more than one cooling station with a single furnace. However, we are not aware of any that could be readily employed either for the fabrication of shaped automobile backlights or shaped automobile sidelights without substantial dismantling and rebuilding of the apparatus. It would be desirable for the glass sheet and tempering art to develop apparatus that was capable of being so used with only minor adjustments needed to convert the apparatus from a capability to produce rear windows to one for producing side windows, and vice versa.

2. Description of Patents of Interest

U.S. Pat. No. 3,684,473 to Ritter discloses glass sheet bending and tempering apparatus comprising a common furnace and a pair of cooling stations disposed on opposite transverse sides of a shaping station beyond the exit of the common furnace. The apparatus of this patent diverts alternate shaped sheets to opposite lateral sides of the shaping station to permit one glass sheet to be cooled while the next sheet is being shaped in the shaping station. All the glass sheets handled in this apparatus are of identical shape.

U.S. Pat. No. 3,846,106 to Seymour and U.S. Pat. No. 4,197,108 to Frank et al disclose apparatus for shaping and tempering glass sheets in which the glass sheets are deposited on a ring-like member after they are shaped at a shaping station and conveyed into a curved space defined by opposed sets of nozzles relative to an axis of bending that is aligned with a path of travel that the glass sheets take along a conveyor that extends through a heating furnace and into a cooling station. The glass sheets are shaped about an axis substantially parallel to the path of movement.

European Patent Publication No. 3391 to McMaster et al discloses a glass sheet shaping and tempering apparatus in which a single furnace is provided with a cooling station in any one, two or three positions, either longitudinally beyond the shaping station or to either side of the shaping station. All three stations can receive heated and bent glass for tempering to increase the system output. This patent also recognizes that the cooling station aligned with the longitudinal direction of the furnace can also be used to temper sheet glass that is not bent. The nozzles from the blastheads in this latter patent are arranged in vertically spaced, flat planes to provide a flat space through which bent glass sheets are conveyed during their cooling that follows their shaping step. This patent does not recognize the benefit of an access area to facilitate changing the mold in the shaping station. Instead, this patent relies on the glass sheet sagging onto a ring-like shaping member after it is transferred thereto from a vacuum holder.

SUMMARY OF THE INVENTION

The present invention relates to a method and apparatus for shaping and tempering glass sheets of substantially different sizes such as those found in side windows and rear windows of automobiles. The apparatus comprises a common furnace and a common shaping station having readily replaceable bending means. The apparatus comprises a first cooling station located beyond the shaping station along a first axis approximately parallel to the initial path of glass sheet movement through the furnace and the shaping station. The apparatus also includes a second cooling station located to one side of the shaping station along a second axis transverse to the initial path through the furnace and shaping station. An access area is provided to the other side of the shaping station from that occupied by the second cooling station.

The first cooling station comprises a first upper plenum and a first lower plenum. A first set of upper nozzles extends downward from the first upper plenum, and the lower ends of the first set of upper nozzles are arranged along an upper curved surface relative to the first axis parallel to the initial path. A first set of lower nozzles extends upward from the first lower plenum. The latter nozzles have upper ends arranged along a lower curved surface relative to the first axis parallel to the initial path. The curved surfaces are vertically spaced from one another to provide a curved space to permit movement of a glass sheet bent at the shaping station to a configuration about a first bending axis essentially parallel to the initial path of movement. A first ring-like member supports a bent glass sheet for movement along a longitudinal path from the shaping station to the curved space between the first set of upper nozzles and the first set of lower nozzles. A first carriage moves along longitudinal tracks that extend downstream beyond the shaping station and supports the first ring-like member in cantilever fashion.

The second cooling station comprises a second upper plenum and a second lower plenum. A second set of upper nozzles extends downward from the second upper plenum. The lower ends of the second set of upper nozzles are arranged along an upper curved surface relative to a second axis normal to the initial path. A second set of lower nozzles extends upward from the second lower plenum. The latter lower nozzles have upper ends arranged along a lower curved surface relative to the second axis normal to the initial path. The curved surfaces are vertically spaced from one another to provide a curved space to permit movement of a glass sheet bent at the shaping station to a configuration about a second bending axis essentially normal to the initial path. A second ring-like member supports the latter bent glass sheet for movement along a transverse path from the shaping station to the curved space between the second set of upper nozzles and the second set of lower nozzles. A second carriage moves along transverse tracks that extend transversely to the shaping station and supports the second ring-like member in cantilever fashion.

Since the heights of many side windows are substantially equal to the heights of many rear windows and since the common furnace has a width suitable to receive the height dimension of flat blanks to be shaped to either side windows or rear windows, it is desirable to employ a bending mold at the shaping station that defines a bending curve about an axis extending parallel to the path of movement through the furnace in combination with the first cooling station which is provided with nozzles curved about an axis of bending that is an extension of the path of movement through the furnace. Such an arrangement is most suitable when the apparatus is used to fabricate bent, shaped, tempered side windows for automobiles. The second cooling station to one side of the shaping station and the second ring-like member are not operated for this production but need not be removed from the apparatus to operate the apparatus with the first cooling station.

It is necessary, when a narrow furnace is used, to convey the blanks for the rear windows while flat in a lengthwise direction so that their transverse dimensions are on the order of magnitude of the transverse dimensions for the side windows conveyed under the conditions just previously described. However, when relatively long rear windows are being shaped and tempered, they are conveyed in the direction of the longitudinal dimension to the shaping station modified with an elongated mold having a shape defined about a second axis of bending that is transverse to the initial path of movement through the furnace. The second ring-like member moves transversely between the shaping station and the second cooling station wherein the upper and lower nozzles define curvatures about the second axis transverse to the initial path to provide a space conformimg approximately to the shape imparted to the rear window. The first cooling station and first ring-like member are not used during the fabrication of bent, tempered rear windows. However, they need not be removed from the apparatus for rear window fabrication.

The side of the initial path of movement opposite that occupied by the second cooling station is purposely left empty. This purposeful emptiness provides access for operating personnel to replace the bending means when the apparatus is converted from one production pattern to another.

Each ring-like member is supported in cantilever fashion on a carriage that moves on tracks. The tracks terminate shy of the shaping station in close enough relation thereto to enable either carriage to support its associated ring-like member in the shaping station and can be retracted with its associated ring-like member to a retracted position that does not interfere with movement of the ring-like member supported from the other carriage.

Provision is made to either remove a ring-like member from the vicinity of the shaping station when the apparatus is operating with the other ring-like member to produce shaped, tempered glass sheets of a configuration suitable for use with one cooling station. An interlock may be provided to insure that only the proper ring-like member that transports the shaped glass sheet into the first or second cooling station, whichever is proper to use, operates and the other member is inoperative whenever it is proper to use the other cooling station.

These and other characteristics of the present invention will be understood more thoroughly in the light of a description of a preferred embodiment which follows.

DESCRIPTION OF THE DRAWINGS

In the drawings that form part of a description of a preferred embodiment of the present invention.

DESCRIPTION OF THE PREFERRED EMBODIMENT

Figure 1:
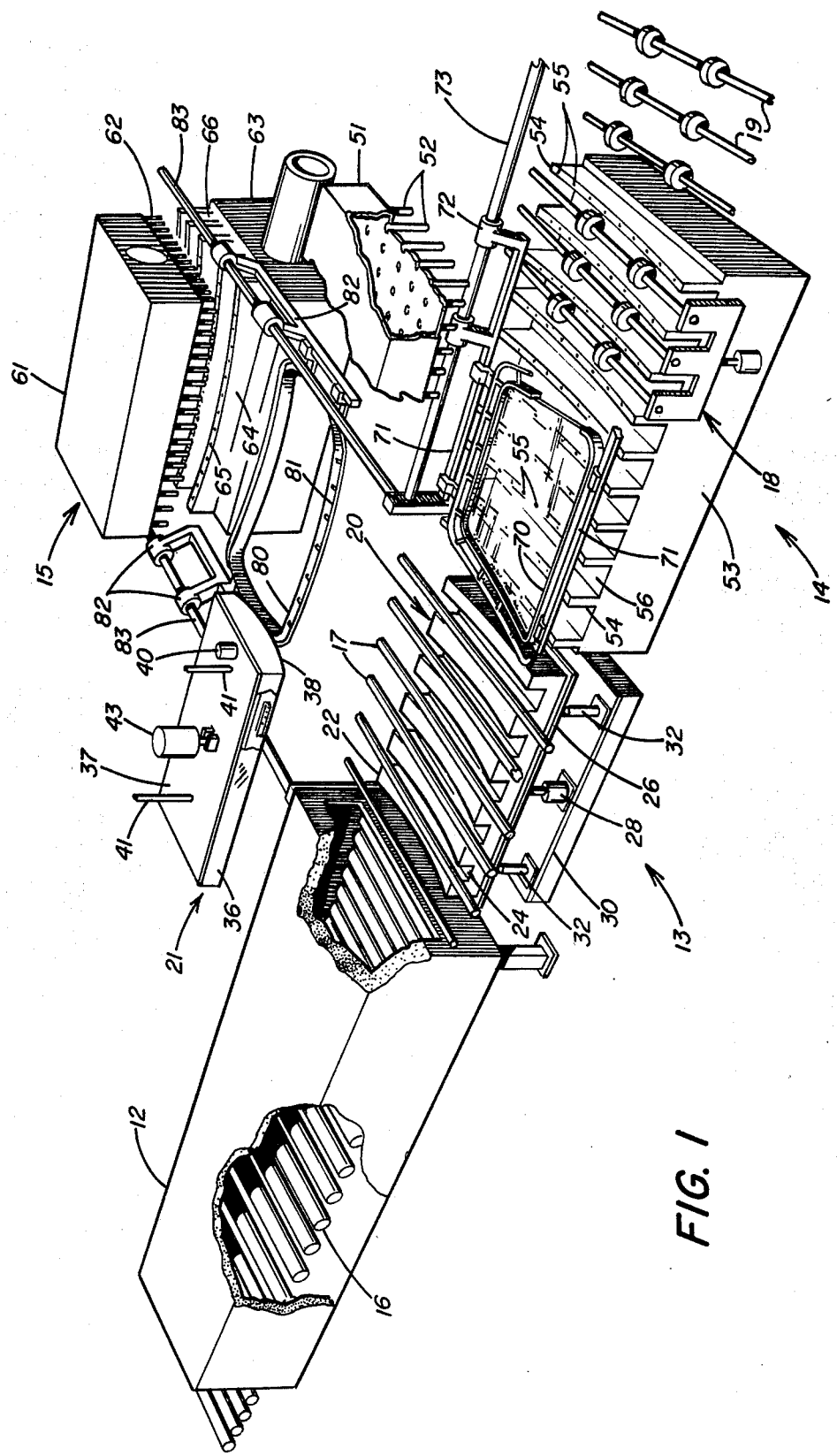
FIG. 1 is a fragmentary isometric view of a preferred embodiment of apparatus conforming to the present invention when the apparatus is arranged to produce tempered glass sheets shaped about an axis extending longitudinally of an initial path extending through a heating furnace.

Referring now to FIG. 1 of the drawings, an apparatus for shaping and tempering glass sheets arranged to produce side windows, includes heating means comprising an elongated tunnel-type furnace 12 through which sheets of glass are conveyed from a loading station at the upstream end of the furnace. A shaping station 13 provided with bending means for shaping glass sheets to a sidelight curvature is disposed beyond the furnace 12 in end-to-end relation therewith. A first cooling station generally indicated at 14 for cooling the shaped sheets of glass is located in end-to-end relation along the initial path extending through the furnace and the shaping station. The first cooling station has a curved space that conforms to the sidelight curvature. A second cooling station 15 (not used in side window production) is located to one side of the shaping station 13.

A conveyor system comprising furnace conveyor rolls 16 and shaping station conveyor rolls 17 is provided to transport flat glass sheets through the furnace 12 and into shaping station 13. A first sheet transfer means 18 of the type depicted in U.S. Pat. No. 4,092,141 to Frank and Lampman, the description of which is incorporated herein by reference, is located in the first cooling station 14 to transfer the shaped and tempered glass sheet to a longitudinal downstream conveyor for transport on removal conveyor rolls 19 to an unloading station.

Heat may be supplied within the tunnel-like furnace 12 by hot gases from a gas furnace or by electric radiant heaters or by a combination of both. These heat supply means are well known in the art. The furnace conveyor rolls 16 define an essentially horizontal initial path along the common upper tangent to a plurality of longitudinally spaced, transversely extending conveyor rolls 16. The initial path of travel extends through the length of the furnace 12 and continues onto additional conveyor rolls 17 also longitudinally spaced and transversely extending that define an extension of the conveyor system into the shaping station 13. The rolls of the conveyor may be arranged in sections and their rotational speed controlled through various control devices (not shown) as is well known in the art. Also, the speed of the different conveyor sections may be controlled and synchronized in a manner well known in the art.

The shaping station 13 comprises a lower shaping mold 20 and an upper vacuum shaping mold 21. The lower shaping mold comprises a plurality of elongated, transversely curved shaping surfaces 22 extending across the entire transverse dimension of mold 20 and conforming in elevational shape to the shape desired for a side window to be bent. The upper surface 22 is interrupted intermittently by transversely extending grooves 24 which extend across the entire transverse dimension of lower shaping mold 20 and provide clearance for raising and lowering the lower shaping mold 20 between a recessed position below the conveyor rolls 18 and an upper position above the level of said conveyor rolls. The lower shaping mold is fixed to a lower mold support structure 26 and readily detachable therefrom to substitute another mold for a different production pattern. Generally, the elongated, transversely curved shaping surfaces 22 of the shaping station prepared for use with a first cooling station 14 is shaped in a direction transverse to the initial path of movement of the glass sheets through the furnace 12.

The lower mold support means 26 is attached to an elevator means 28 in the form of a piston for raising and lowering the lower mold support means 26 and the lower shaping mold 20 that is attached thereto. The upper elongated, transversely curved shaping surfaces 22 of the lower shaping mold 20 are preferably smoothly surfaced to avoid imparting any irregularity in the supported glass sheet surface, is composed of a material that does not react with glass, is easily shaped to the smoothly surface contour desired and has good durability despite intermittent contact with hot glass that causes cyclical temperature variations over an extended period of time. A good material for the grooved lower shaping mold 20 is an alumino-silica cement sold by Johns-Manville under the trademark of TRANSITE®. The elevator means 28 is supported and rigidly mounted to a piston support platform 30 to raise and lower the lower mold support means 26 and its lower attached shaping mold 20. Alignment posts 32 are provided to assure the movement of the lower mold 20 along a desired vertical path of movement.

The grooves 24 have a width and depth sufficient to clear the conveyor rolls 18. The grooves 24 are spaced from one another by a minimum distance along the initial path of glass sheet travel defined by the conveyor rolls 18 that approximates the width of the grooves.

Further details of the bending mold may be found in U.S. Pat. No. 4,197,108 to Frank, Canonaco and Posney, the description of which is incorporated herein by reference.

The upper vacuum mold 21 comprises a vacuum box 36 attached for ready disconnection to an upper mounting plate 37. The box has a lower wall 38 that is apertured. The lower wall 38 is transversely shaped to be approximately complemental to the shaping surface formed by the upper surface 22 of the lower shaping mold 20. The upper vacuum mold 36 communicates with a source of vacuum (not shown) through an evacuation pipe 40 and a suitable valve (not shown). The upper vacuum mold 21 is suitably connected through upper vertical guide rods 41 to an upper supporting frame (not shown) and movable relative thereto by an upper vertical piston 43 supported by said upper supporting frame in a manner well known in the art.

The upper vacuum mold 21 is readily detached from its upper mounting plate 37 to permit rapid substitution of another upper vacuum mold conforming to a different production pattern. Evacuation pipe 40 may be connected through a suitable valve arrangement to a source of pressurized air (not shown), and the valves for the vacuum line and for the pressure line may be synchronized according to a predetermined time cycle in a manner well known in the art.

The apertures in the apertured lower wall 38 of the upper vacuum mold 21 are made as small as possible to minimize distortion of a heat-softened glass sheet supported thereagainst by suction and are spaced as closely as is necessary to assure vacuum support for a hot glass sheet with reasonable energy consumption. Details of a particularly suitable arrangement are found in U.S. Pat. No. 4,197,108 to Frank et al, the disclosure of which is incorporated herein by reference.

The platforms that support the upper vertical piston 43 and the elevator means piston 28 are supported from an open frame structure that is readily accessible from an access area (shown adjacent to shaping station 13) to facilitate replacement of the readily replaceable molds 20 and 21 with other molds.

The first cooling station 14 comprises a first upper plenum 51 provided with a first set of longitudinally spaced, transversely extending rows of transversely spaced pipe nozzle 52 extending downwardly to direct air applied under pressure to the first upper plenum 51 toward the upper surface of the glass sheet when the latter is aligned with the bottom openings of the nozzles. The first set of upper pipe nozzles 52 have lower ends that terminate in an upper curved space about an axis extending longitudinally of the initial path of glass sheet movement through the furnace 12.

Opposing the first upper plenum 51 of the first cooling station 14 is a first lower plenum 53. The latter is provided with lower bar-type nozzle housings 54 disposed with thick walls extending vertically and having a first set of elongated openings 55 directed upward through their width dimension so that air applied under pressure to the first lower plenum 53 is directed upward through the elongated openings 55 against the lower major surface of the supported glass sheet. The upper ends of the bar-type nozzle housings 54 are curved and spaced vertically below the upper pipe nozzles 52 to provide clearance along a transversely curved space about the first axis parallel to the initial path of movement of glass sheets through the furnace 12. This conforms to the transverse shape of the glass sheets conveyed therebetween. The lower bar-type nozzle housings 54 are provided with spaces 56 therebetween. These spaces are open-sided to help the removal of blasts of air applied to cool the glass sheets in the cooling station.

The second cooling station 15, which is not used in the arrangement depicted in FIG. 1, is located along a side of the shaping station 13 opposite the access area, and comprises a second upper plenum 61 provided with longitudinally spaced, transverse rows of transversely spaced pipe nozzles 62 extending downward to direct air applied under pressure to the second upper plenum 61 toward the upper surface of a shaped glass sheet that occupies a position aligned with the bottom openings of the second set of upper nozzles 62. The lower ends of the nozzles 62 provide a series of openings along a curved surface that is curved about an axis transverse to the initial path of glass sheet movement through the furnace.

Opposing the second upper plenum 61 is a second lower plenum 63 provided with a second set of lower bar-type nozzle housings 64 similar to the lower bar-type nozzle housings 54 of the first cooling station. The nozzle housings 64 extend parallel to the initial path, which is transverse to a transverse axis of movement between the shaping station 13 and the second cooling station 15. The housings 64 are disposed with thick walls extending vertically and have a second set of elongated openings 65 directed upward through their width dimension so that air applied under pressure to the second lower plenum 63 is directed upward through the second set of elongated openings 65 against the lower major surface of a supported glass sheet. The openings of the second lower bar-type nozzle housings 64 oppose corresponding openings in the second set of upper pipe nozzles 62. The bar-type nozzle housings 65 are spaced vertically below the upper pipe nozzles to provide a curved space about an axis extending transversely of the initial path, thereby providing clearance for moving glass sheets bent about an axis transverse to the initial path, such as in the case when shaping glass sheets to rear window configurations.

A first ring-like member 70 comprising a rail that extends in the form of a ring-like structure disposed edgewise with its width forming the height of the rail is associated with the first cooling station 14. The ring-like member defines an outline conforming to the shape of glass sheets shaped at the shaping station 13 to a bend about an axis extending parallel to the initial path through the furnace 12 as defined by the lower shaping mold 20 and the vacuum mold 21. Connectors are attached at their inner ends to the lateral outer surface of the rail of the first ring-like member 70 at spaced points therealong and at their outer ends to a reinforcing frame 71.

The reinforcing frame 71 is preferably constructued of an outer steel pipe similar in outline shape to that of the ring-like member 70 and surrounds the latter in spaced relation thereto. The reinforcing frame is connected to a carriage 72 through connecting members. The carriage is provided with means for riding along a pair of longitudinally extending tracks 73 that extend in the direction of the initial path on opposite sides of the first cooling station 14. The tracks 73 are located so that they terminate entirely downstream of the shaping station 13. The reinforcing frame 71 and the ring-like member 70 that supports the bent glass sheet and receives it from the upper vacuum mold 21 during a shaping and tempering operation are supported from the first carriage 72 in cantilever arrangement extending upstream. This allows the first carriage 72 to be supported on tracks 73 extirely beyond the shaping station 13 even when the ring-like member 70 occupies the shaping station 13.

The apparatus just described operates in a manner to shape and temper glass sheets just as if the second cooling station were absent. The molds 20 and 21 shape a glass sheet about a longitudinal axis parallel to the initial path to form a transversely curved sheet in the form of a side window that is dropped onto the ring-like member 71 for transport into the curved space between the first set of upper nozzles 52 and the first set of lower nozzles 55. Carriage 72 is reciprocated along longitudinal tracks 73 to avoid the need for an elongated cooling station while cooling the shaped glass for sufficient time to develop an adequate temper.

As stated previously, molds 20 and 21 are mounted for ready detachment and replacement by molds defining different production patterns. These different production patterns can be other side window patterns that are fabricated using the first cooling station 14 and a ring-like member 70 defining a shape about a longitudinal axis replacing the first ring-like member 70 attached to carriage 72. According to the present invention, it is also possible to replace mold 20 with a mold 120 that defines a shaping surface about an axis transverse to the initial path. A typical lower shaping mold 120 has a series of elongated shaping surfaces 122 extending across the entire width of mold 120 interrupted by transversely extending grooves 124 and the upper surface 122 define a shape that conforms to the longitudinal shape of a rear window for an automobile. The upper shaping surfaces 122 are generally straight in their direction transverse to the initial path and are curved from side to side of the elongated shaping surfaces 122 in the direction of said initial path. The lower mold 120 is secured to the lower mold support means 26 for movement therewith. Also, vacuum mold 21 is removed from upper mounting plate 37 and replaced with a vacuum mold 121 having a shaped lower wall 138 that is curved about a transverse axis relative to said initial path.

It it obvious that a glass sheet bent about a transverse axis is hard to move into the curved space defined by the first set of upper nozzles 52 and the first set of lower nozzles 54 about a longitudinal axis unless the curved space was changed in configuration or made so wide that the blasts of cold air are weakened en route to the major glass surfaces sufficiently to make adequate tempering difficult. In order to avoid such a problem, the second cooling station 15 is provided with a curved space between nozzle openings adapted to receive a transversely moving backlight.

The second cooling station 15 comprises a ring-like member 80 similar to ring-like member 70 except that it defines an elevational shape about an axis transverse to the initial path and conforms in shape and elevation to the outline of a bent rear window rather than a bent side window. The second ring-like member 80 is connected to a second reinforcing frame 81 in a manner similar to that of the first ring-like member 70. The reinforcing frame 81 is connected to a second carriage 82 which is movable on tracks 83 that extend transversely on opposite sides of the second cooling station 80 and terminate to one side of the shaping station 13 opposite the aforesaid access area. The second reinforcing frame 81 and its supported ring-like member 80 are supported in cantilever relation from the second carriage 82 so that the carriage remains on tracks 83 to one side of the shaping station 13 when the ring-like member 80 is in the shaping station.

When glass sheets are bent to form side windows, they are moved in a series along the initial path of movement through the furnace 12 to the shaping station 13 which is provided with a lower shaping mold 20 defining a shape about an axis extending along the initial path of glass sheet movement through the furnace. On arrival of a glass sheet with the lower shaping mold 20 in a position below the level occupied by the shaping station conveyor rolls 17, the lower shaping mold 20 is lifted toward the upper vacuum mold 21. The glass sheet is transferred by a combination of lifting and suction into engagement against the shaped lower wall 38 of the upper vacuum mold 21 to impart a transverse shape about an axis extending longitudinally of the initial path of movement. The upper vacuum mold 21 and the lower shaping mold 20 are separated and the carriage 72 conveys the ring-like member 70 into position below the upper vacuum mold 21 and vacuum is released, with possible accompaniment of pressure through the upper vacuum mold box 36 to transfer the bent glass sheet from the upper vacuum mold 21 onto the ring-like member 70. The carriage is then actuated to move the ring-like member 70 with the glass sheet supported thereon into the curved space between the lower ends of the first set of upper pipe nozzles 52 and the upper ends of the first set of the lower nozzles 55 which defines a curved space conforming to the shape imparted to the shaped glass sheet at the shaping station 13. The first ring-like member 70 is maintained in moving oscillatory motion between the nozzles while air is blown against the opposite surfaces of the glass sheet for sufficient time to impart at least a partial temper into the glass. After a sufficient period of time, the first ring-like member 70 is moved toward the mold unloading means 18 which lifts the shaped and tempered glass sheet off the mold and transfers it onto the removal conveyor rolls 19.

Figure 2:
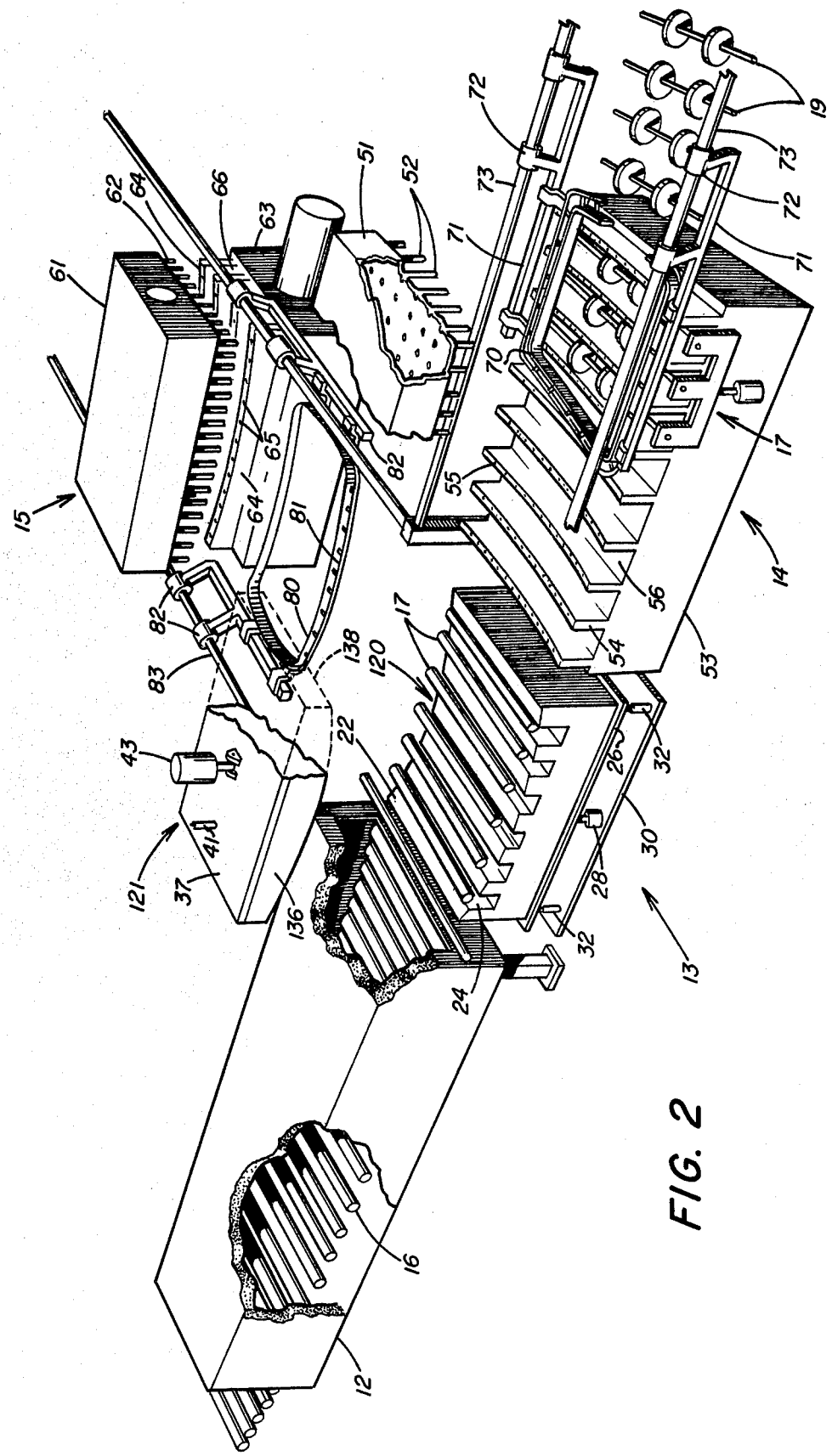
FIG. 2 is a view similar to that of FIG. 1 when the apparatus is arranged to substitute shaping means to produce tempered glass sheets shaped about an axis extending transversely of said initial path.

Should it be necessary to bend glass sheets to a curve characteristic of a rear window, the shaping station 13 is modified by replacing the lower shaping mold 20 defining a transverse curve about a longitudinal axis and its complementary shaped upper vacuum mold 21 with a lower shaping mold 120 and a corresponding upper vacuum mold 121. Both define a space curved about a transverse axis that intersects the shaping station 13 and the second cooling station 15. The glass sheets to be bent into rear windows are moved lengthwise through the furnace and arrive at a temperature sufficient for shaping and tempering at the modified shaping station 13. At this time, the lower shaping mold 120 lifts the heat-softened glass sheet into engagement with the upper vacuum mold 121 and the glass sheet is transferred by a combination of lifting and vacuum to engage the shaped lower wall 138 of the vacuum mold 121 shaped as depicted in FIG. 2. The upper vacuum mold 121 and the lower shaping mold 120 are separated from one another. At this time, the second carriage 82 moves on transverse tracks 83 to move the second ring-like member 80 into position between the upper vacuum mold 121 and the lower shaping mold 120 with the latter spaced from one another. The vacuum on the upper vacuum mold 121 is released to deposit the shaped glass sheet onto the ring-like member 80 for transfer into the second cooling station 15. Here the second carriage 82 moves the second ring-like member 80 on the transverse tracks 83 and reciprocates the second ring-like member 80 when the glass sheet supported thereon is between the second set of upper pipe nozzles 62 extending downward from the second upper plenum 61 and the second set of lower nozzles 65 extending upward from the second plenum 63. When the cooling step is complete and a temper imparted to the glass, the glass sheet is removed from the second ring-like member 80 and transferred to a second removal conveyor (not shown) disposed on the far side of the second cooling station 15. The first cooling station 14 may remain in place while the apparatus is shaping and tempering glass sheets using the shaping station 13 and the second cooling station 15.

It is advisable to remove an unused carriage from the vicinity of the shaping station 13 when the other carriage is used. However, it is sufficient to provide adequate switching means that energizes only a motor that actuates movement of the first carriage 72 along the longitudinal carriage tracks 73 when the upper vacuum mold 21 is installed with lower shaping mold 20 to define a transverse shape about an axis parallel to the initial path, and to automatically inhibit carriage 82 to move into position adjacent the bending station 13 when the apparatus is used to shape and temper glass sheets that require the use of ring-like member 70 and the first cooling station 14 and to energize only a motor that actuates movement of the second carriage 72 along the transverse carriage tracks 83 when the shaping station 13 is arranged to produce a shape about the axis of bending defined by upper vacuum mold 121 and lower shaping mold 120 while inhibiting inward movement of carriage 72 along the longitudinal carriage tracks 73 toward the shaping station 13.

The form of the invention shown and described in this disclosure represents an illustrative preferred embodiment thereof. It is understood that various changes may be made without departing from the gist of the invention as defined by the claimed subject matter that follows.

I claim:

1. An improvement in an apparatus for shaping and tempering glass sheets of the type characterized by an enclosed tunnel-like furnace, a shaping station, an initial glass movement path through said furnace and into said shaping station, a first cooling station along a longitudinal extension parallel to said initial glass movement path, a second cooling station having a glass movement path transverse to said initial glass movement path wherein said first and said second cooling stations include upper and lower plenums each having sets of nozzles extending toward said respective glass movement paths the first cooling station having a first ring-like member for supporting a bent glass sheet between said nozzles and the second cooling having a second ring-like member for supporting a bent glass sheet between said nozzles, the improvement comprising:
a means beyond said shaping station for supporting said first ring-like member in cantilever fashion for movement along said longitudinal path including tracks extending longitudinally in flanking relation to said first cooling station; and
means entirely to one side of said shaping station for supporting said second ring-like member in cantilever fashion for movement along said transverse path comprising tracks extending transversely of said glass movement path in flanking relation to said second cooling station.

2. Apparatus as defined in claim 1 wherein said shaping station is exterior of said furnace in end-to-end relation therewith.

3. A method of shaping and tempering glass sheets to produce tempered sheets of different configurations comprising the steps of:

conveying a first sheet through a hot enclosed atmosphere in an initial glass movement path into a shaping station;

transferring said first sheet by means of a first ring-like member supported in cantilever fashion to a first cooling station situated along a longitudinal path parallel to said initial glass movement path;

conveying a second sheet through said hot enclosed atmosphere in said initial glass movement path into said shaping station; and transferring said second sheet by means of a second ring-like member supported in cantilever fashion to a second cooling station situated along a path transverse to said initial glass movement path.

4. A method as defined in claim 3, wherein said glass sheet is supported by at least a partial vacuum at said shaping station, is deposited at said shaping station onto a selected one of said two ring-like members having an outline shape substantially conforming to one of two shapes desired for shaped glass sheets and is transferred between said shaping station and a selected one of said cooling stations while supported on said selected ring-like member.

5. A method as described in claim 4 farther comprising a repetition of said conveying and transferring steps so as to define a substantially continuous process of shaping and tempering glass sheets.

* * * * *